May 4, 1965 D. R. BROOKING 3,181,541
APPARATUS WASHER

Filed Sept. 30, 1963 2 Sheets-Sheet 1

INVENTOR.
DONALD R. BROOKING
BY William A. Murray
ATTORNEY

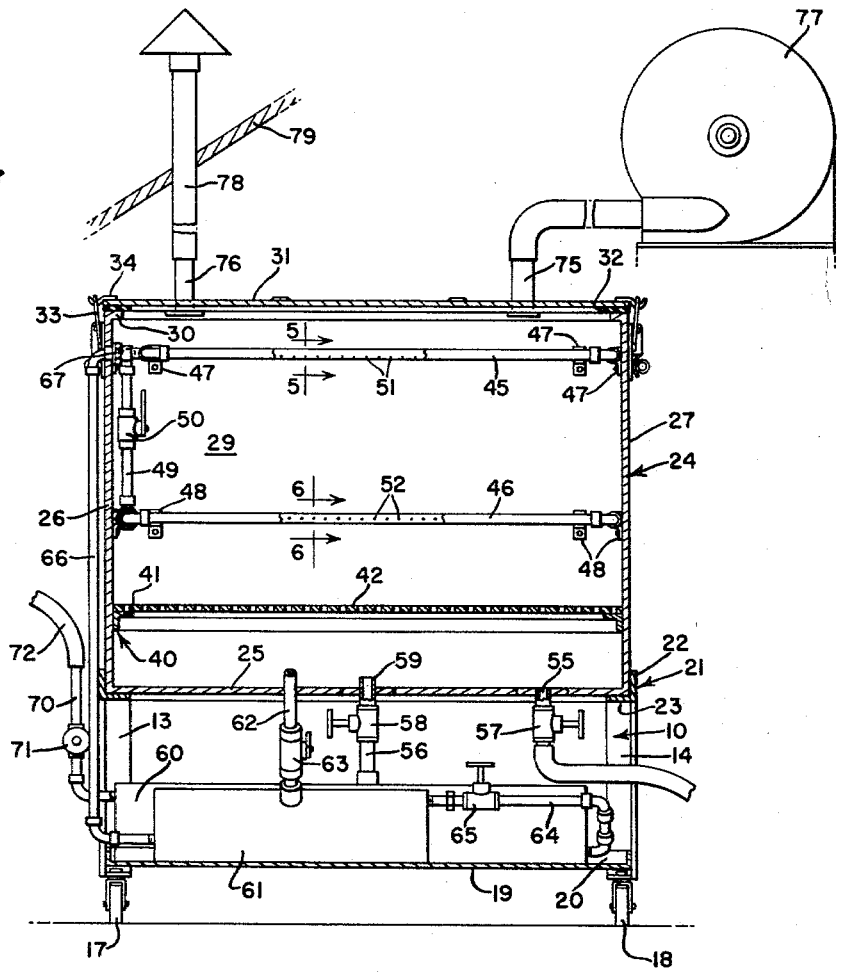

United States Patent Office 3,181,541
Patented May 4, 1965

3,181,541
APPARATUS WASHER
Donald R. Brooking, 4129 27th Ave., Rock Island, Ill.
Filed Sept. 30, 1963, Ser. No. 312,439
5 Claims. (Cl. 134—186)

This invention relates to a cleaner or washer utilized to clean apparatus heavily laden with oil and grit accumulated with the oil. More particularly this invention relates to a cleaning device utilizing a highly volatile cleaning fluid for penetrating the oil and grit.

When operating equipment, for example in a newspaper office, much of the equipment operates at high speed and is highly greased and oiled. This creates a condition in which grit and dirt become impregnated in the oil and grease. Therefore, cleaning and reoiling the equipment is a common occurrence and must be done regularly to maintain operational efficiency of the equipment. Generally cleaning fluids for these apparatus must be of the type that will cut or dissolve grease and oil. Most cleaning agents are toxic and in many instances are highly volatile and odoriferous thereby making it unpleasant to work or be around. Often the fumes are dangerous to human inhaling.

Many washers consist of a tank in which the apparatus is submerged a sufficient time for a cleaning action to occur. The main difficulty with this type of operation is that the time consumed to clean each apparatus is considerable and unpleasant gases or vapors are released as the apparatus is submerged or is removed from the tank. Also, many apparatus require a pressure application of the fluid to clean the remote and grit impacted areas.

Some washers utilize a manually operated spray unit for spraying the apparatus. The difficulty with spraying is that, as mentioned previously, the volatile characteristics of most of the cleaning fluids are such that working with a spray creates an unpleasant and often dangerous condition. Therefore, when working with a spray time must be allowed to permit the gases and vapors to condense back to their liquid state.

With the above in mind, it is the primary object of the present invention to provide a cleaning device composed of a completely enclosed cleaning tank having one side adapted for removal to permit egress and ingress. The removable side is sealed when closed to permit a pressure buildup in the tank. The tank has a floor therein with a drain. Directly beneath the floor are adjoining fluid containers serving as reservoirs for the fluid. A vertical conduit extends from the one reservoir to the tank and extends through the floor to an upper lip above the floor. A porous or generally open platform is provided above the floor to support the apparatus to be cleaned. A pair of horizontally disposed conduits circumscribe the inner surfaces of the tank and have side openings for emitting fluid onto the apparatus. The latter conduits are connected to and receive fluid from the reservoirs. An air pressure unit is connected to the reservoir and suitable valves are provided so that the fluid may be churned from the bottom through the tank floor, or the apparatus may be sprayed from the circumscribing conduits around the inner surfaces of the tank.

A further object of the invention is to provide with the cleaning mechanism as provided above, means that will operate to discharge the cleaning from the conduits intermittently as spray and vapor.

It is still a further object of the invention to provide in the sealed cleaning tank an air inlet and air outlet with a pressurized air hose connected to the inlet. The outlet is connected to an air vent discharging out at an area remote from the tank and preferably completely outside of the building housing the washer.

Other objects and advantages of the present invention will become apparent to those skilled in the art as the nature of the invention is better understood from the following disclosure and as shown in the accompanying drawings.

FIG. 4 is a vertical sectional view through a vertical longitudinal plane inwardly of a side wall of the washer and showing portions thereof in representative form.

FIG. 5 is a sectional view taken along the line 5—5 of FIG. 4.

FIG. 6 is a sectional view taken along the line 6—6 of FIG. 4.

Figure 1:
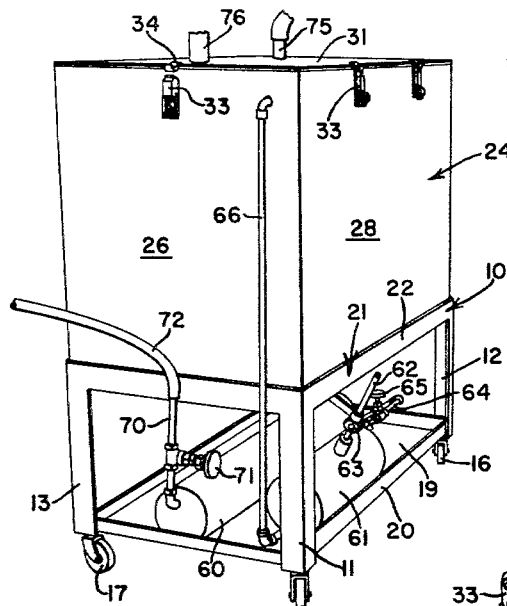
FIG. 1 is a perspective view taken from one end and side of the washer.

Referring now to the drawings, the entire device is supported on a main frame 10, having four legs 11, 12, 13, and 14 carried on caster wheels 15, 16, 17, and 18 and interconnected at their lower ends by a horizontally disposed panel 19 with vertical flanges such as at 20 welded or otherwise fixed at their corners to legs 11–14. The upper portions of the legs are rigidly joined by a rectangular horizontally disposed angle iron structure 21 having a vertical flange 22 and an inwardly extending horizontal flange 23 forming a horizontal shelf for receiving and supporting the lower portion of a washing tank, indicated in its entirety by the reference numeral 24.

Figure 2:
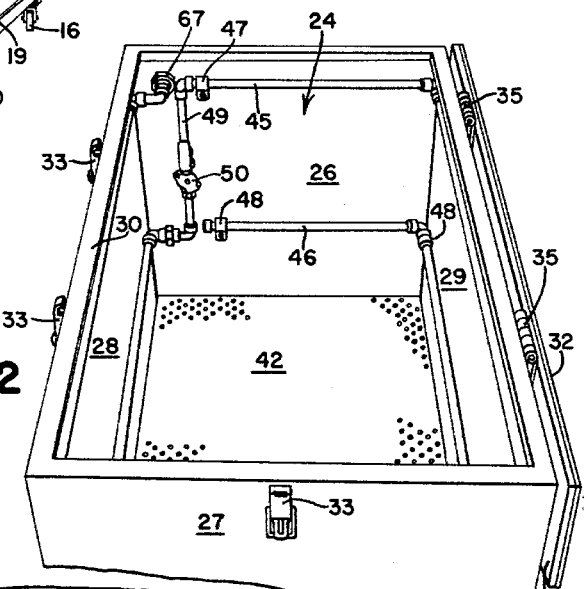
FIG. 2 is a perspective view taken from above and at one end of the washer.
Figure 3:
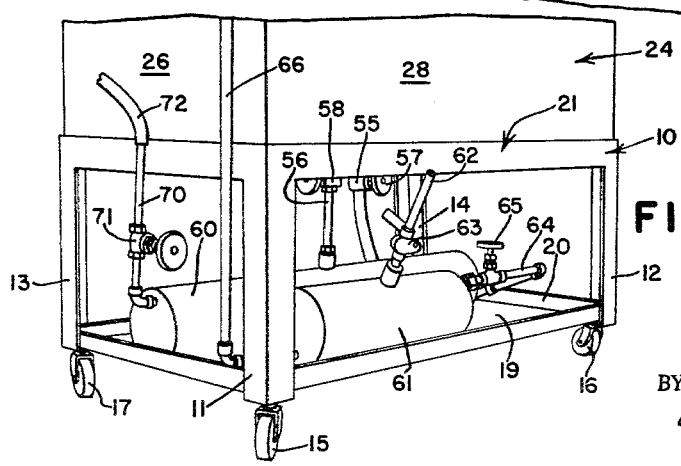
FIG. 3 is a perspective view of the lower portion of the washer and taken from an end and side.

The tank 24 is composed of a floor 25 having its outer edge portions resting on the flange 23, opposite upright end walls 26, 27, and opposite upright side walls 28, 29. The upper edges 30 of the walls 26–29 flange inwardly to form a continuous shelf on which a top side or cover 31 may rest. A gasket or seal 32 is fixed to the underside of the cover adjacent its edges and normally, when the cover is closed, engages the shelf 30. The cover 31 is hinged at 35 at one edge to the upper portions of the side wall 29. A series of spring latches 33 fixed on the walls 25–28 at suitable intervals have loop elements adapted to extend over brackets 34 rigidly projecting from the edges of the cover 31. Therefore, as indicated in FIG. 2, the entire tank 24 is completely enclosed and has a removable top side or cover 31 for permitting ingress and egress of the apparatus to be or having been cleaned.

An angle iron structure 40 is welded to the inner surfaces of the upright walls 26, 27, 28, 29 and has a laterally inwardly extending flange 41 serving as part of an open platform above but relatively close to the floor 25. The flange 41 serves as an edge support for a removable perforated false bottom 42 on which may be placed the apparatus to be cleaned.

Rectangularly shaped upper and lower parallel peripheral tubes 45, 46 respectively are supported by clips 47, 48 on the inner surfaces of the walls 26–29. The tubes 45, 46 are interconnected by a vertical tubing 49 having a manual control valve 50 therein for purposes of adjusting the quantity of fluid passing to the lower tube 46. Referring now to FIGS. 5 and 6, the upper tube 45 has fluid outlets 51 facing internally and downwardly and the lower tube 46 has outlets 52 facing directly and horizontally inwardly. The lower tube 46 is above, but relatively close to the false bottom 42.

The tank 24 has a pair of vertical drain pipes 55, 56 depending from the floor 25 with valves 57, 58 respectively for controlling the place of fluid discharge. The upper edge of the pipe 55 is flush with the floor 25. The upper edge portion 59 of the pipe 56 projects above the floor 25 for purposes later to be explained.

The pipe 56 extends downwardly and communicates internally with a fluid container 60, the first of a pair of first and second fluid containers 60, 61 respectively. The containers 60, 61 are completely sealed with the exceptions of the pipes and conduits communicating with them.

The second container 61 has a fluid inlet conduit 62, having a valve 63 therein, through which fluid may be introduced into the container. The two containers 60, 61 communicate with each other by means of an interconnecting pipe system 64 extending from the top of one end of the second container 61 to the bottom of one end of the first container 60. A hand valve 65 is provided in the system 64.

The second container 61 communicates with the upper tube 45 by means of a vertical pipe 66 extending from the other end of the container 61 outwardly of the end wall 26 to the height of the upper tube 45 and then inwardly of the tank 24. Suitable fittings 67 are provided in the wall 26 to permit passage of the pipe through the wall 26 and for connection to the conduit 45.

The first fluid container 60 has an air inlet pipe 70, also having a valve 71 therein, with an upper end connected to a hose 72 leading to a pressurized air source, not shown.

The cover 31 is provided with an air inlet 75 and air outlet 76. The inlet is connected to an air blower or fan, indicated at 77, and outlet 76 is in communication with an outside vent pipe 78 extending through a roof 79 or other outside wall of the building.

The washer operates in the following manner. Cleaning fluid is introduced to the containers 60, 61 through the inlet 62. The valve 58 is opened so as to prevent an air block when filling the containers. The apparatus to be cleaned is placed on the false bottom 42 and the cover 31 is sealed shut by the spring latches 33.

Normally it is desirable to clean the device or apparatus by spraying it from the peripheral conduits 45, 46. To do so, the valves 57, 58, and 63 are closed and the valves 50, 65, and 71 are opened. Air moving through the hose 72 and into the first tank 60 will drive the cleaning fluid from the first and second tanks into the conduits 45 and 46 to be sprayed through the outlets 51, 52 onto the apparatus in jets or sprays and fog or vapor. Peculiar to the use of air in such an arrangement of containers is the fact that the fluid will be dispensed intermittently in spray and fog. This is due to the fact that the air will force fluid through the pipes to be discharged as spray until a stream of air momentarily forces a path through the fluid and is permitted to pass into the conduits 45, 46 with a small quantity of fluid to form fog or vapor that is discharged from the conduits. The viscous nature of the fluid will, however, cause the air path to close and fluid will again be discharged as spray from the conduits. This form of discharge will continue until the fluid is completely empty from the containers. It is considered beneficial to have the fog or vaporized fluid for deep penetration of the apparatus being cleaned. The spray generally has the advantage of being discharged with some force and consequently effects better cleaning in locations in the apparatus where pressure is required for cleaning. Also the spray will operate as a rinsing fluid in moving loosened dirt from the apparatus.

With this particular cleaning arrangement, considerable vapor will be generated within the tank 24. The vapor will condense to its liquid form as it falls to the bottom of the tank. If sufficient time were allowed, the vapor would completely condense to a liquid. However, by using the blower 77 to force air through the tank 24, the vaporized fluid is forced through the outlet 76 and vent 78 outward of the building or at an area remote from the tank. The small amount of fluid loss will be negligible and the bulk of the fluid will be in a liquid state at the base of the tank 24. However, by blowing the vapor from the tank, the cleaning unit or washer may be used immediately to clean other apparatus and upon opening the door 31 the vapor loss to the atmosphere of the room is of such negligible quantity as to be unoffensive and not dangerous to surrounding personnel. Most cleaning fluids when in a liquid form will not easily pass into the vapor state unless churned or otherwise artificially vaporized. Therefore, once the actual vapor is removed from the tank by the blower 71, the liquid at the bottom of the tank will create no serious problem if the door is opened. If the tank is to be left open for a long period of time, the liquid would normally be drained back to the containers 60, 61.

In some instances, it is desirable to permit an apparatus to rest or soak in the fluid for cleaning purposes. However, when this is done it is desirable to create a churning or movement of the fluid. This condition may be created by driving the fluid into the tank in the manner set forth above and to then close the valve 65 and open the valve 58. Air under pressure from the hose 72 will then move through the pipe 56 and churn the fluid on the floor 25. The air will vent out of the outlet 76. In this latter cleaning action false bottom 42 may be removed and apparatus may rest directly on the floor 25 above the pipe 56.

Dirt, grit, and other foreign matter collected with the fluid as it passes through the apparatus being cleaned will normally float to the bottom of the fluid to be deposited on the floor 25. After only a few moments most of the foreign matter will be deposited on the floor 25. The remaining fluid is relatively clean and may be recirculated through the system by draining it into the containers 60, 61 through the drain pipe 56. By providing the top edge 59 of the pipe 56 to extend above the floor 25, the deposited foreign matter on the floor will not pass into the pipe 56. Consequently, the pipe 56 has its own filtering system to permit reuse of the fluid. Upon sufficient foreign matter being collected on the floor 25, it may be drained out of the tank through the drain pipe 55.

While only one form of the invention has been shown, it should be recognized that other forms and variations will occur to those skilled in the art. Therefore, while the preferred form was shown in concise and detailed manner for purposes of clearly and concisely illustrating the principles of the invention, there was no intention to limit or narrow the invention beyond the broad concepts set forth in the appended claims.

What is claimed is:

1. An apparatus cleaner comprising: an upwardly opening cleaning tank having a floor and upright side walls extending to upper edges defining the upper opening; an open apparatus-supporting platform supported spacedly above the floor; upper and lower interconnected horizontally disposed conduits extending around the inner surfaces of the upright walls with the lower of the conduits being above the platform, said upper conduit having outlets therein for directing fluid inwardly and downwardly, said lower conduit having outlets therein for directing fluid horizontally inwardly; a fluid container supported beneath the floor; a conduit communicating with the container and extending upwardly through the floor and terminating at an open upper lip adjacent to but above the surface of the floor; a valve in the latter conduit; connecting means effecting communication between the container and said upper conduit; an air pressure inlet in said container; a lid for said opening with means associated therewith for sealing the upper opening of the tank; an air inlet and air outlet in the lid; a conduit extending from the outlet to a place remote from the tank; and a pressurized source of air communicating with the tank via the inlet.

2. An apparatus cleaner comprising: an upwardly opening cleaning tank having a floor and upright side walls extending to upper edges defining the upper opening; an open apparatus-supporting platform supported spacedly above the floor; horizontally disposed conduit means extending around the inner surfaces of the upright walls having outlets therein for directing fluid inwardly; a fluid container supported beneath the floor; a conduit communicating with the container and extending upwardly through the floor and terminating at an open upper lip adjacent to but above the surface of the floor; a valve in the latter conduit; connecting means effecting communication between the container and said conduit means; an air pressure inlet in said container; a lid for said opening with means associated therewith for sealing the upper opening of the tank; an air inlet and air outlet in the lid; a conduit extending from the outlet to a place remote from the tank; and a pressurized source of air communicating with the tank via the inlet.

3. An apparatus cleaner comprising: structure including an enclosed cleaning tank having a removable side permitting ingress and egress and including a floor; an open apparatus-supporting platform supported spacedly above the floor; conduit means supported in the tank and having outlets therein directed toward the platform; a fluid container supported on the structure beneath the floor; a conduit communicating with the container and extending upwardly through the floor and terminating at an open upper lip adjacent to but above the surface of the floor; a valve in the latter conduit; connecting means effecting communication between the container and said conduit means and including valve means adjustable to effect the communication; an air pressure inlet in the container; an air inlet and air outlet in the tank; a conduit extending from the outlet to a place remote from the tank; and a pressurized source of air communicating with the tank via the inlet.

4. An apparatus cleaner comprising: structure including an enclosed cleaning tank having a removable side permitting ingress and egress; an apparatus-supporting platform supported in the tank; conduits supported on the tank internally thereof and having outlets therein directed toward the platform; a fluid container supported on the structure beneath the underside of the tank; a conduit communicating with the container and extending upwardly through the underside and terminating at an open upper lip adjacent to but above the underside; a drain pipe fixed to the underside and having an upper end flush with the underside; connecting means effecting communication between the container and the conduits; valve means in the connecting means; an air pressure inlet in the container; an air inlet and air outlet in the tank; a conduit extending from the outlet to a place remote from the tank; and a pressurized source of air communicating with the tank via the inlet.

5. The invention defined in claim 3 in which the connecting means communicates with the container at a lower portion thereof and the air inlet opens into the container at an upper portion thereof.

References Cited by the Examiner
UNITED STATES PATENTS

| | | | |
|---|---|---|---|
| 1,114,591 | 10/14 | Delaney | 134—199 |
| 2,486,251 | 10/49 | Braun | 98—115 |
| 2,570,021 | 10/51 | Beach | 134—200 X |

CHARLES A. WILLMUTH, *Primary Examiner.*

G. J. NORTH, *Examiner.*